Figure 1:
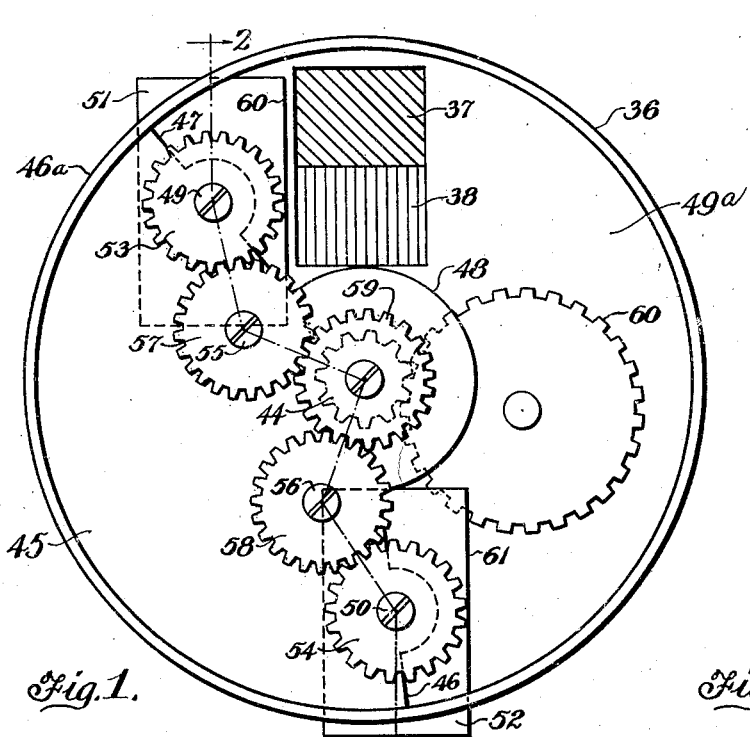
Figure 2:
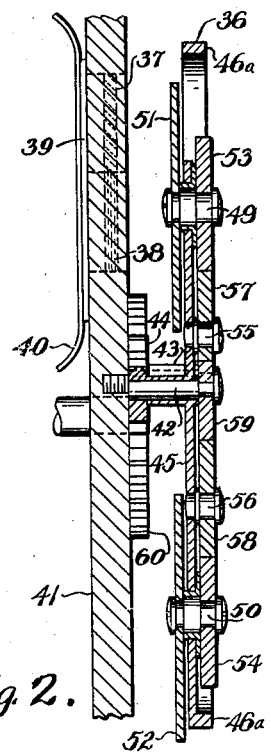
Figure 3:
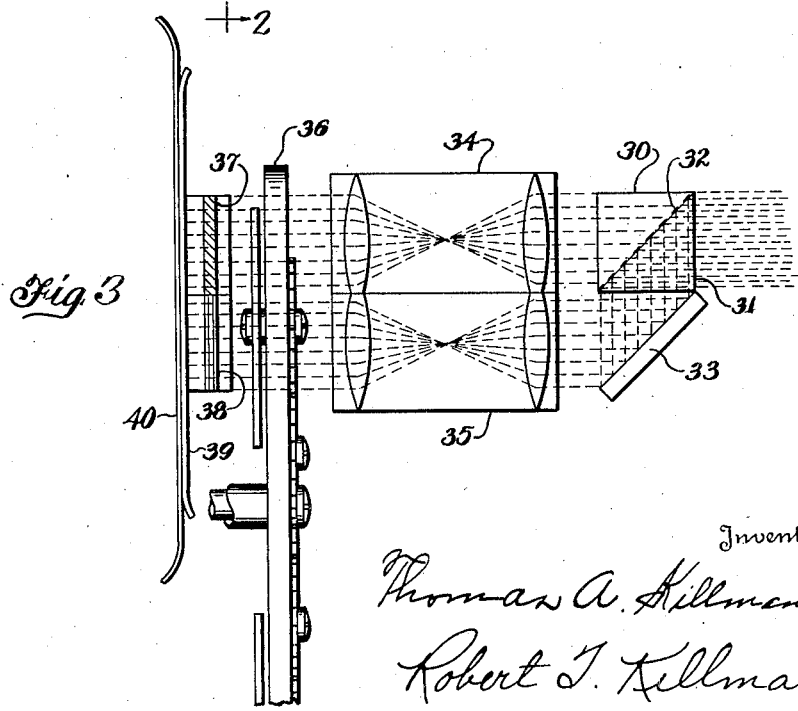

Nov. 10, 1936.  T. A. KILLMAN ET AL  2,060,505
COLORED MOTION PICTURE CAMERA
Original Filed Sept. 16, 1935

Inventors
Thomas A. Killman
Robert T. Killman

Patented Nov. 10, 1936

2,060,505

UNITED STATES PATENT OFFICE 2,060,505

COLORED MOTION PICTURE CAMERA

Thomas A. Killman and Robert T. Killman,
Nashville, Tenn.

Original application September 16, 1935, Serial No. 40,774. Divided and this application February 26, 1936, Serial No. 65,857

5 Claims. (Cl. 88—16.4)

This application is a division of our co-pending application filed Sept. 16, 1935, Serial No. 40774.

Our invention relates to process of producing motion pictures in natural colors by the use of attachments which may be fitted to the standard machines now in use.

One of the objects of our invention is the elimination of all color fringe and color flicker in both moving and stationary objects together with the elimination of all lack of registration due to parallax, difference in motion phase and the like.

Another object of this invention is to evolve a method of producing motion pictures faithfully in the natural colors of the object, the method requiring only slight modification of the standard machines and apparatus now in use.

Briefly the method is as follows. The beam of light from the object to be photographed is divided into two identical beams of the same aspect. This is done by a special combination of prisms and reflectors, and matched twin lenses. The two beams are passed through two color filters, one beam through each filter. The filters are of substantially complementary colors, and are stationary. The two beams of light pass through an aperture plate, having an opening which accommodates two standard picture frames, to a panchromatic film. Interposed between the film and the lenses is a special rotary shutter which interrupts the beams, to time the exposures and to cut off the light while the film is being moved. This shutter is so arranged that, at any instant, the same portions of the two frames are covered or exposed. This is to cause the image of any moving object to occupy exactly the same relative position in each frame at the beginning and end of each exposure. During the time between successive exposures the film is advanced a distance equal to two frames. Thus there will be produced upon the negative film a succession of pairs of images, the two images of each pair being made from the same aspect, and exposed during exactly the same interval of time, one of the images being a record in varying tones of gray of all the values of one color possessed by the object, and the other image being a similar record of all the values of the complementary color possessed by the object. The negative images are printed onto a positive which is intended to be projected by the mechanism disclosed in our co-pending application filed Sept. 16, 1935, Serial No. 40774.

The mechanism by which these and other objects are attained is described in the following specifications and claims together with the accompanying drawing in which, Figure I is a front view of the special shutter used in the camera.

Figure II is a side sectional view of the same taken along the line 2—2 of Figure I.

Figure III is a diagrammatic view of the arrangement of the various elements in the camera.

The means employed in our invention for photographing objects onto the film is shown diagrammatically in Figure III. A compound prism made up of the right triangular prisms 30 and 31 receives the light from the object. Prism 31 has its widest face partially silvered or fully silvered with lines scratched across it, so as to make this surface a partial reflector. This surface is cemented with transparent cement to the corresponding surface of prism 30. This arrangement causes the received beam to be split into two components of substantially equal strength, one beam passing through the upper lens system 34, through the opening in the shutter, generally designated as 36 (and to be more fully described later), through the green filter 37, through the aperture plate 39 to the film 40 making an image thereon of the green light from the object being photographed. The other beam, reflected by the partial reflecting surface of the compound prism strikes the surface reflector 33, and passes through the lower lens system 35, the opening in shutter 36, the red filter 38, aperture plate 39, to the film 40, registering thereon in a frame adjacent to the first image, an image of the red light coming from the object.

The shutter now cuts off both beams of light and an intermittent mechanism (not shown) advances the film two frames, the shutter opens and the process is repeated.

In order that images of moving objects shall register perfectly on the screen, it is necessary that all points on one frame be exposed to the light and cut off from the light at exactly the same instant that the corresponding point on the other frame is exposed and cut off.

In order to accomplish this result we have provided the camera shutter mechanism best shown in Figures I and II. Projecting outward from the plate 41 which contains the double aperture and the color filters 37 and 38, is the stud 42, rotatable on which is the sleeve 43 which carries at its inner end the shutter drive gear 44, and at its outer end the shutter plate 45. For purposes of stability and balance the plate 45 is surrounded by a ring 46a. The shutter plate 45 is cut away on the radial lines 46 and 47 and the circular line 48 to form the light transmitting opening 49a. Short shafts 49 and 50, rotatably mounted in bearings in the shutter plate carry at their ends nearest the film 40, shutter segments 51 and 52 of substantially rectangular shape. The other ends of shafts 49 and 50 carry the small gear wheels 53 and 54. Rotatably mounted on studs 55 and 56 located in the shutter plate 45 and meshing with gears 53 and 54 are the idler gears 57 and 58. Rigidly mounted on the stud 42 is the stationary gear 59, meshing with the idler gears 57 and 58. Gears 53, 54 and 59 are the same size. The parts are so placed that edge 60 of segment 51 and edge 61 of segment 52 project out into the open part of the shutter bounded by radial lines 46 and 47, circular lines 48 and ring 46a, and these edges are placed in a vertical position.

When the shutter rotates, being driven by gear 60 meshing with gear 44, the shutter segments 51 and 52, due to the action of the gears, maintain their vertical positions so that as they pass over the aperture, they cover and uncover simultaneously corresponding points of the two images.

Various modifications of the forms herein disclosed in detail will be apparent to those skilled in the art and it should not be understood that we are limited to these illustrative forms, except as indicated in the following claims.

We claim as our invention:

1. A cinematograph camera for producing color sensation records, comprising a double sized film aperture, an optical light beam dividing and directing system composed of plane non-refracting reflectors and cooperating matched lenses through which the component beams are transmitted to a common focal plane to produce a plurality of images from the same aspect of view on adjacent picture areas of the film; color filters bearing substantially complementary colors interposed in each component beam; a shutter comprising a rotatable sector disk supporting a plurality of separately rotatable shutter segments each having a vertically disposed edge for cutting the light beams, and gear means for maintaining the vertical position of said edge during rotation of said sector disk.

2. Means for producing motion pictures in natural colors including in a camera, means for dividing and directing a beam of light from the object to be photographed, said means comprising a plane partial reflector set at an angle to the beam, a full surface reflector adapted to receive the reflected portion of the beam from the first named reflector, matched twin lenses adapted to receive and focus the beams from the said dividing and directing means; stationary color filters having substantially complementary colors interposed in the two beams after they emerge from the twin lenses; a film aperture plate of a size to accommodate two picture frames; shutter means for interrupting the light beams simultaneously, comprising a shutter sector plate, a plurality of vertical shutter segments adapted for rotation upon said sector plate; gear means causing said segments to maintain their vertical position as the sector plate rotates, said gear means comprising a gear attached to each segment, a stationary gear mounted centrally of the sector plate, and idler gears cooperating with the stationary gear and the first named gears.

3. In a motion picture camera designed to expose simultaneously a plurality of images of an object, shutter means for simultaneously exposing to and shielding from the action of the light corresponding points on the images, said shutter means including a rotatable sector disk, a plurality of separately rotatable shutter segments carried by said disk, each segment having a vertically disposed edge for cutting the light beams, and gear means for maintaining the vertical position of said edge as the sector disk rotates.

4. In a motion picture camera designed to expose simultaneously a plurality of frames of film to a plurality of images of an object, shutter means for simultaneously exposing and shielding corresponding points of the images, said shutter means including a rotatable sector disk, separately rotatable shutter segments carried on said disk and having an edge for cutting a light beam, said edge being parallel to a line through corresponding points of the images and gear means for maintaining said parallelism as said edge passes through the light beam.

5. In a motion picture camera, a light interrupting shutter, comprising a rotatable shutter disk, a plurality of separately rotatable shutter segments carried upon said disk, each segment having a light beam cutting edge, said edges being all parallel each to the other, and all lying in a predetermined direction in relation to the other parts of the camera, and means for maintaining said parallelism and said direction as the sector disk revolves.

THOMAS A. KILLMAN.
ROBERT T. KILLMAN.